(12) United States Patent
Fujimoto et al.

(10) Patent No.: US 9,169,886 B2
(45) Date of Patent: *Oct. 27, 2015

(54) BRAKE DISC FOR RAILWAY VEHICLE

(71) Applicant: NIPPON STEEL & SUMITOMO METAL CORPORATION, Tokyo (JP)

(72) Inventors: Takahiro Fujimoto, Kobe (JP); Kazutaka Asabe, Hyogo (JP); Takanori Kato, Hyogo (JP); Hiroshi Nogami, Takatsuki (JP); Hirotoshi Kawabe, Hyogo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/268,155

(22) Filed: May 2, 2014

(65) Prior Publication Data

US 2014/0238790 A1    Aug. 28, 2014

Related U.S. Application Data

(63) Continuation of application No. 13/110,325, filed on May 18, 2011, now Pat. No. 8,794,398, which is a continuation of application No. PCT/JP2009/071032, filed on Dec. 17, 2009.

(30) Foreign Application Priority Data

Dec. 19, 2008    (JP) .................................. 2008-324195

(51) Int. Cl.
*F16D 65/12*        (2006.01)
*B61H 5/00*         (2006.01)
(Continued)

(52) U.S. Cl.
CPC .................. *F16D 65/12* (2013.01); *B61H 5/00* (2013.01) *F16D 65/0006* (2013.01); *F16D 65/124*; (2013.01); *F16D 65/128* (2013.01); *F16D 65/847* (2013.01); *F16D 2065/138* (2013.01); *F16D 2065/1332* (2013.01); *F16D 2065/1392* (2013.01)
(Continued)

(58) Field of Classification Search
CPC ..... F16D 65/12; F16D 65/128; F16D 65/847; F16D 65/1332; F16D 65/1392; B61H 5/00
USPC ............ 188/218 XL, 73.1, 73.2, 71.6, 264 A, 188/264 AA See application file for complete search history.

(56) References Cited

U.S. PATENT DOCUMENTS 2,024,328 A    12/1935    Batie
2,775,322 A    12/1956    Bachman
(Continued)

FOREIGN PATENT DOCUMENTS

CN    1130732    9/1996
DE    3120104    4/1982
(Continued)

*Primary Examiner* — Vishal Sahni
(74) *Attorney, Agent, or Firm* — Clark & Brody (57) ABSTRACT

A brake disc for a railway vehicle, including a ring-shaped plate portion with a front side serving as a frictional surface and a plurality of fins being projected and disposed radially on the back side of the plate portion, the plate portion being fixed to a wheel, wherein a rib is provided between fins adjacent to each other, and a slit developing in the direction from a wheel-side face of the rib toward the back side of the plate portion is disposed in a circumferentially intermediate portion of the rib, thereby making it possible to suppress the deformation caused by frictional heat.

3 Claims, 7 Drawing Sheets

(51) Int. Cl.
*F16D 65/00* (2006.01)
*F16D 65/847* (2006.01)
*F16D 65/02* (2006.01)

(56) References Cited

U.S. PATENT DOCUMENTS

| | | | |
|---|---|---|---|
| 4,132,294 A | 1/1979 | Poli | |
| 5,004,078 A * | 4/1991 | Oono et al. | 188/218 A |
| 5,101,940 A | 4/1992 | Mungo et al. | |
| 2004/0163902 A1 | 8/2004 | Meroni et al. | |
| 2008/0067018 A1 | 3/2008 | Smith et al. | |

FOREIGN PATENT DOCUMENTS

| | | |
|---|---|---|
| DE | 3935635 | 5/1991 |
| EP | 0291429 | 12/1991 |
| JP | 2-67127 | 5/1990 |
| JP | 2-67128 | 5/1990 |
| JP | 05288231 | 11/1993 |
| JP | 2000-310263 | 11/2000 |
| JP | 2001-311441 | 11/2001 |
| JP | 2005-321091 | 11/2005 |
| JP | 2007-205428 | 8/2007 |
| JP | 2008-261443 | 10/2008 |
| TW | 200420844 | 10/2004 |

* cited by examiner

BRAKE DISC FOR RAILWAY VEHICLE

This application is a Continuation of U.S. Ser. No. 13/110,325 filed on May 18, 2011, which is a Continuation of PCT/JP2009/071032 filed on Dec. 17, 2009.

TECHNICAL FIELD

The present invention relates to a brake disc for a railway vehicle in which a plate portion serving as frictional surface is fixed to a wheel. Particularly, the present invention relates to a brake disc for a railway vehicle which enables the deformation to be caused by frictional heat during braking to be suppressed.

BACKGROUND ART

As brake systems for land transport vehicles typified by railway vehicles, there are block brake, drum brake, disc brake etc. Among them, the use of disc brake has been increasing recently in association with an increase in speed and size of vehicles.

The disc brake is a device which obtains a braking force by friction between a brake disc and a brake lining. Usually, in the brake disc, a braking force is generated by pushing a brake lining against a frictional surface of a ring-shaped brake disc which is fixed to an axle or a wheel with bolts. With the braking force, the rotation of the axle or wheel is regulated to control the vehicle speed.

Super high-speed railway vehicles such as the Shinkansen have been further improved in speed and an operation thereof at a speed exceeding 300 km per hour is demanded. For further speed-up of railway vehicles, reduction of vehicle weight is necessary, and a brake disc in which a plate portion serving as a frictional surface is directly fixed to a wheel is suited. This is because this frictional-surface-fixed-type brake disc does not need a devoted part that solely serves for the fixing and therefore it is possible to attain the reduction of weight, in comparison with the conventional inner periphery fixing type brake disc.

In the conventional frictional-surface-fixed-type brake disc, for the purpose of suppressing deformation such as warpage caused by frictional heat during braking, a concave portion to be closely fitted with a convex portion formed on a member to be fixed (e.g., wheel) is formed on the brake disc surface for fixing (Patent Literature 1). There have been conventional frictional-surface-fixed-type brake discs for which a total volume ratio between fixing parts and counter portions to be fixed is prescribed (Patent Literature 2).

In such conventional frictional-surface-fixed-type brake discs, the problem of an increase in noise, to which no consideration has been conventionally given, is becoming an issue in such a high-speed traveling condition as exceeding 300 km per hour.

The brake disc rotates at high speed together with the associated wheel. With this rotation, the air around the brake disc is sucked in from the inner periphery side and is discharged to the outer periphery side. Consequently, a high-speed air flow occurs on the back side of the brake disc.

The air flow plays an important role for cooling the brake disc, but in such a high-speed range as exceeding 300 km per hour, the high-speed air flow not only cools the brake disc but also generates noise, which is called "aerodynamic noise."

For reducing the aerodynamic noise it is effective to suppress the flow of air between the back side of the brake disc plate portion as well as fins formed thereon and a plate portion of wheel.

Figure 10A:
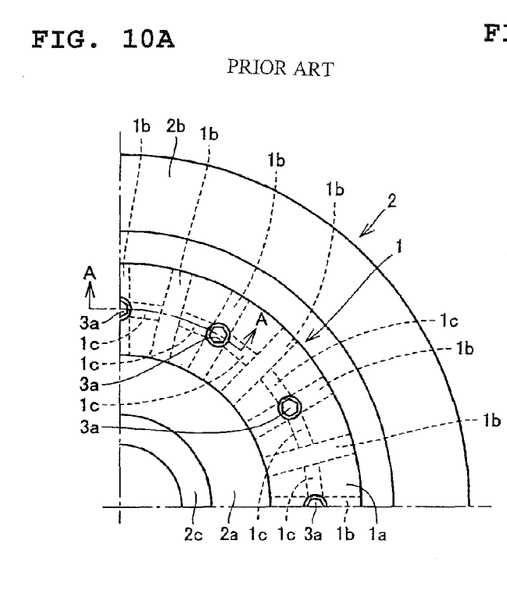
FIG. 10A is a plan view of a quadrant portion.
Figure 10B:
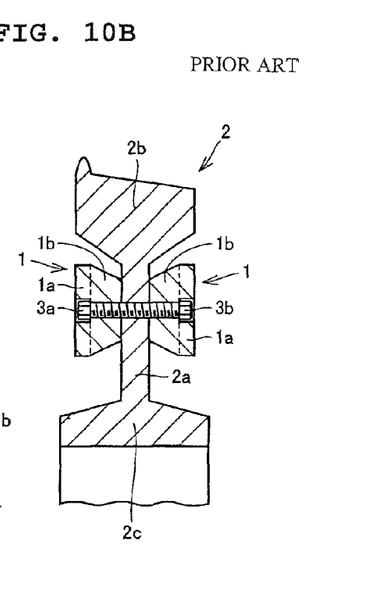
FIG. 10B is a sectional view of a semicircular portion.
Figure 10C:
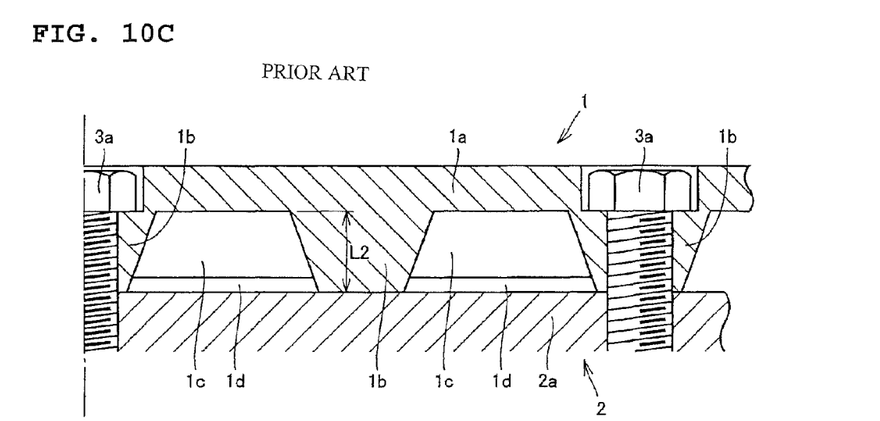
FIG. 10C is a sectional development view taken from A-A in FIG. 10A.

The present applicants have proposed such brake disc 1 as shown in FIG. 10 in which ribs 1c interconnected circumferentially are provided in spaces defined by the back side of a plate portion 1a and fins 1b, both being constituents of the brake disc 1, and a plate portion 2a of wheel 2, to minimize a total opening area in a circumferential direction (Patent Literature 3). In FIG. 10, numeral "1d" denotes a gap between a tip of each rib 1c and the plate portion 2a of the wheel 2, the tip of rib being configured so as to generate the gap. Numeral "2b" denotes a rim portion of the wheel 2. Numeral "2c" denotes a boss portion of the wheel 2, numeral "3a" denotes a bolt for fixing the brake disc 1, and numeral "3b" denotes a nut for fixing the brake disc 1.

CITATION LIST

Patent Literature

Patent Literature 1: Japanese Patent Application Publication No. 2001-311441

Patent Literature 2: Japanese Patent Application Publication No. 2005-321091

Patent Literature 3: Japanese Patent Application Publication No. 2007-205428

SUMMARY OF INVENTION

Technical Problem

However, in the case of the brake disc proposed in Patent Literature 3, deformation of the brake disc caused by frictional heat during braking may pose problems, depending on the shape of the ribs formed in spaces between the back side of the plate portion of and fins of the brake disc and the wheel plate portion.

It is an object of the present invention to provide a frictional-surface-fixed-type brake disc for a railway vehicle which brake disc can suppress the deformation thereof caused by frictional heat during braking in case of forming ribs in spaces formed between the back side of a plate portion of and fins of the brake disc and a plate portion of a wheel.

Solution to Problem

For reducing the aerodynamic noise, as is disclosed in Patent Literature 3, it is effective to reduce the total opening area provided on the back side of the brake disc. The present inventors have made various experiments and analyses, envisioning a high-speed traveling condition as exceeding 300 km per hour, for a wheel equipped with a frictional-surface-fixed-type brake disc, in addition to the above finding.

As a result, it was confirmed that the shape of rib disposed in each space between the back side of the plate portion of and fins of the brake disc and the wheel plate portion did not exert any influence on an aerodynamic noise reducing effect as long as the total opening area was the same. We found out that deformation of the brake disc caused by frictional heat could be suppressed by defining the rib shape properly.

Figure 3:
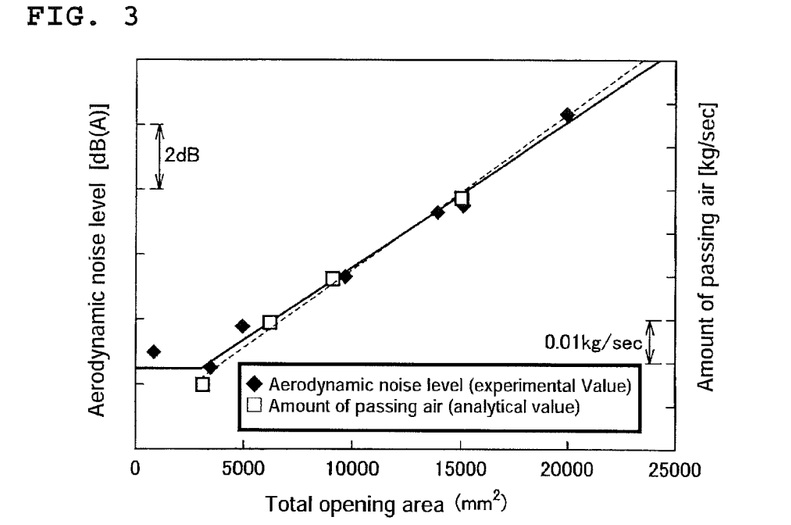
FIG. 3 is a diagram showing the relations of a total area of openings formed in spaces to aerodynamic noise levels obtained experimentally and to the amounts of passing air obtained analytically.

FIG. 3 is an example of results of the experiments and analyses conducted by the present inventors, showing the relations of the total area of openings left in spaces having ribs to the aerodynamic noise level obtained by the experiments, and to the amount of passing air obtained by the analyses.

The opening area refers to the area of opening which is identified when seen from the inner periphery side of the brake disc, in the spaces each of which is defined by the back side of the plate portion of the brake disc, fins and ribs disposed on the back side thereof, and the wheel plate portion, when the brake disc and wheel are fixed. The total opening area refers to the total area of added openings in spaces in a circumferential direction relevant to the passing air.

From FIG. 3 it is evident that the smaller total opening area permits the lower aerodynamic noise, more specifically, the aerodynamic noise can be reduced as the total opening area becomes smaller, for example, from 10000 mm² or less to 7000 mm² or less and further to 5000 mm² or less, and that there occurs almost no change in the amount of decrease in the aerodynamic noise in case of 3000 mm² or less in terms of a total opening area. Further, it is evident that the smaller total opening area permits the smaller amount of passing air as well as an expected amount of decrease of aerodynamic noise. From these results it is evident that the amount of decrease of the aerodynamic noise can be evaluated by calculating the amount of passing air with use of fluid analysis.

Figure 1A:
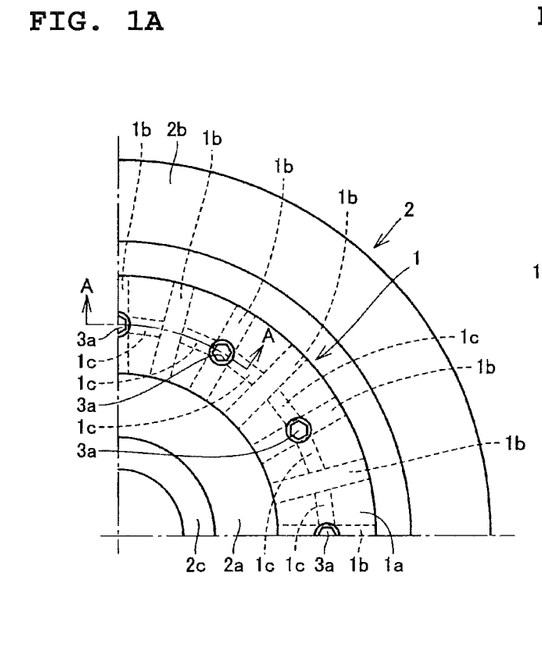
FIG. 1A is a plan view of a quadrant portion.
Figure 1B:
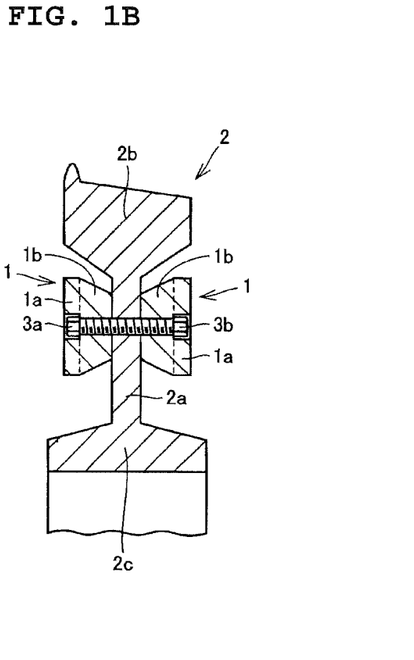
FIG. 1B is a sectional view of a semicircular portion.
Figure 4:
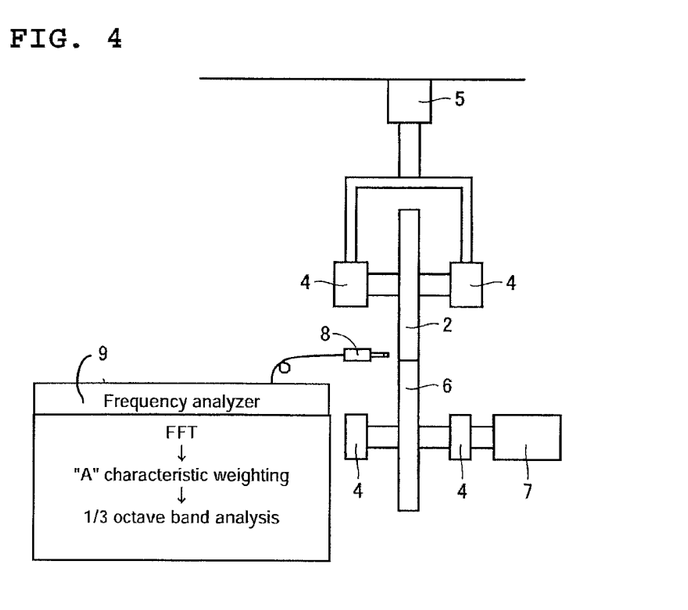
FIG. 4 is a diagram explaining an outline of a rolling noise testing rig.

The results shown in FIG. 3 have been obtained by using a rolling noise testing rig shown in FIG. 4 and by installing and testing, on the rolling noise testing rig, a wheel 2 (wheel dia.: 860 mm) equipped with a brake disc 1 shown in after-mentioned FIG. 1.

The rolling noise testing rig has such a configuration as shown in FIG. 4, in which a wheel 2 to be tested is supported rotatably by bearings 4 and is pushed against a rail-profile wheel 6 with a hydraulic jack 5, and then the rail-profile wheel 6 is rotated with a motor 7 to thereby rotate the wheel 2.

In this rolling noise testing rig, the speed is expressed in terms of a peripheral speed of the rail-profile wheel 6 and is determined from both the number of revolutions of the motor 7 and the diameter (910 mm in the present example) of the rail-profile wheel 6. When the number of revolutions of the motor 7 is about 1750 rpm, the peripheral speed is 300 km/h.

In measurement, a precision sound level meter 8 was set at a distance of 300 mm away from the wheel 2 to measure noise generated from the wheel 2 during rotation. The weighting of the precision sound level meter 8 was FLAT (in a condition not applying weighting) and dynamic characteristics were FAST. Further, a noise level when the opening was completely closed was subtracted from the noise level of the wheel equipped with the brake disc and the result was used as an aerodynamic noise level.

Figure 5:
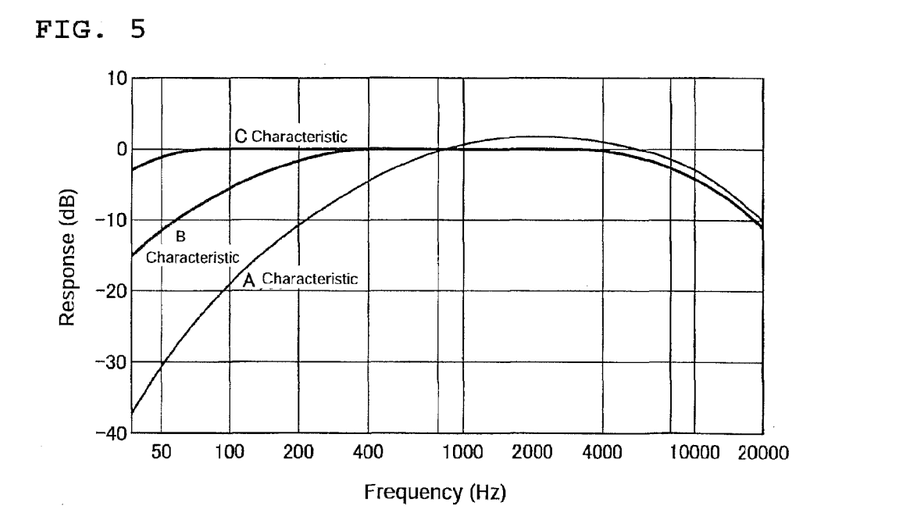
FIG. 5 is a diagram showing an "A" characteristic weighting curve.

The testing speeds were set each at an interval of 10 km/h between 200 to 360 km/h in terms of a peripheral speed of the rail-profile wheel 6. After the measurement with the precision sound level meter 8, frequency analysis was made by fast Fourier transform with use of a frequency analyzer 9 and "A" characteristic weighting (see FIG. 5) was applied, followed by ⅓ octave band processing, and both frequency characteristic and overall value were evaluated.

The brake disc for a railway vehicle according to the present invention has been accomplished on the basis of the above-mentioned findings, and is a frictional-surface-fixed-type brake disc for a railway vehicle. For suppressing deformation of the brake disc caused by frictional heat, the brake disc for a railway vehicle according to the present invention includes a ring-shaped plate portion with a front side serving as a frictional surface, and a plurality of projected fins disposed radially on the back side of the plate portion, the plate portion being fixed to a wheel, wherein a rib is provided between adjacent fins, and at a circumferentially intermediate position in the rib, a slit is radially provided with a depth in a direction from a wheel-side end portion of the rib toward the back side of the plate portion.

Advantageous Effects of Invention

According to the present invention, since at a circumferentially intermediate position in a rib disposed on the back side of a brake disc, a slit is provided with a depth in a direction from a wheel-side end portion of the rib toward the back side of the plate portion, deformation caused by frictional heat can be effectively suppressed even in a frictional-surface-fixed-type brake disc.

BRIEF DESCRIPTION OF DRAWINGS

FIG. 1 is a diagram showing a principal portion of a brake disc for a railway vehicle according to the present invention in case of a depth ratio (L1/L2) of a slit provided in each rib being 1, in which

FIG. 2 is a diagram showing a principal portion of a brake disc for a railway vehicle according to the present invention in case of a depth ratio (L1/L2) of a slit provided in each rib being less than 1, in which

FIG. 10 is a diagram showing the brake disc for a railway vehicle disclosed in Patent Literature 3, in which

DESCRIPTION OF EMBODIMENTS

A brake disc for a railway vehicle according to an embodiment of the present invention will be described below with reference to FIGS. 1 and 2.

Figure 1C:
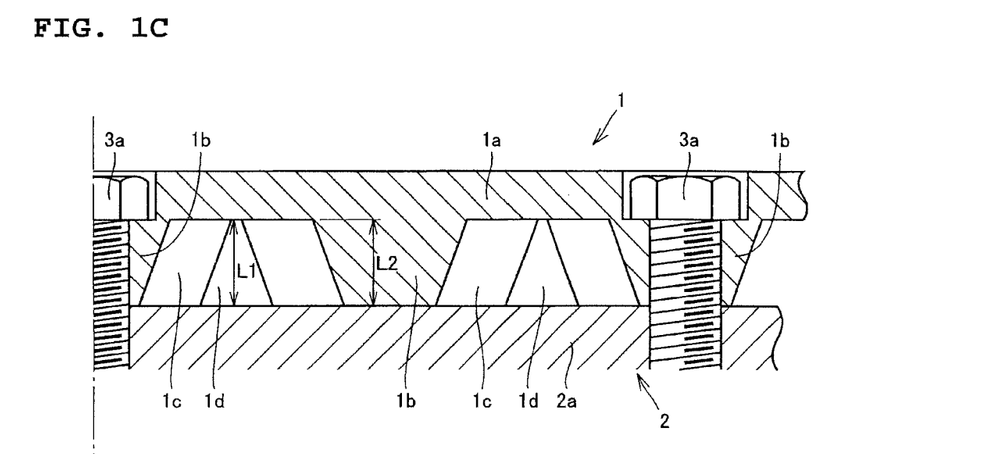
FIG. 1C is a sectional development view taken from A-A in FIG. 1A.
Figure 2A:
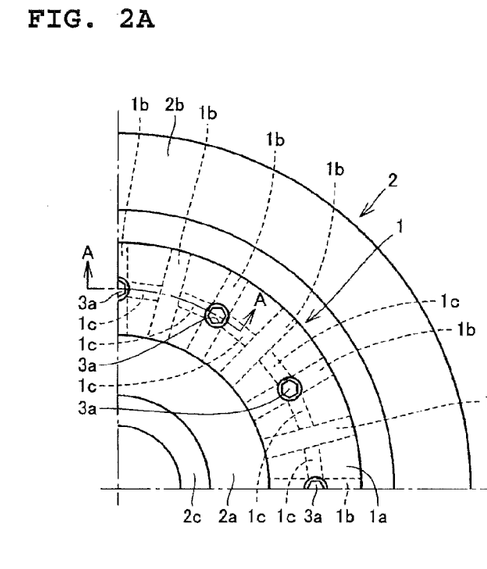
FIG. 2A is a plan view of a quadrant portion.
Figure 2B:
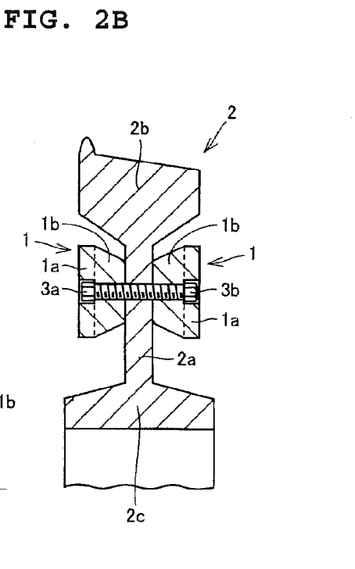
FIG. 2B is a sectional view of a semicircular portion.

FIGS. 1 and 2 illustrate a principal portion of a brake disc 1 for a railway vehicle according to the present invention, the brake disc 1 being secured to a plate portion 2a of wheel 2 with use of fixing bolts 3a and fixing nuts 3b. As shown in FIGS. 1 and 2, the brake disc 1 includes a ring-shaped plate portion 1a with a front side serving as a frictional surface. A plurality of fins 1b, each of which is projected from the back side of the plate portion 1a, are radially disposed. A pair of brake discs 1 are disposed so as to sandwich the plate portion 2a of the wheel 2, and the brake disc plate portions 1a are fixed to the wheel 2 by means of fixing bolts 3a and nuts 3b in a state that the tips of the fins 1b are contacted with the plate portion 2a of wheel 2. As a result, trapezoidal spaces are generated, which are defined by the back side of the plate portion 1a of the brake disc 1, plural fins 1b disposed on this back side, and the plate portion 2a of the wheel 2.

In the brake disc 1 of the present invention, trapezoidal ribs 1c are projected and circumferentially disposed, one in each space, being between adjacent fins 1b and defined by the back side of the plate portion 1a of the brake disc 1 and the plate portion 2a of the wheel 2. The ribs 1c shown in FIGS. 1 and 2 are disposed at a radius-wise intermediate position of the brake disc 1.

At a circumferentially intermediate position in each rib 1c, there is provided a trapezoidal slit 1d with a depth in a direction from a wheel side face of rib 1c toward the back side of the brake disc plate portion 1a. Providing these slits 1d makes it possible to suppress the deformation of the brake disc 1 caused by frictional heat.

Figure 2C:
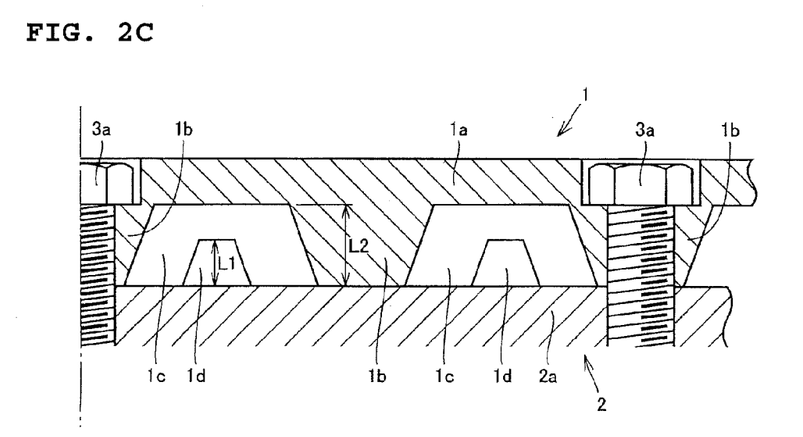
FIG. 2C is a sectional development view taken from A-A in FIG. 2A.

According to the results of experiments and analyses made by the present inventors, when the brake disc is fixed to the wheel 2, it is preferable that an area of openings, which are identified in the spaces generated between the plate portion 1a, fins 1b and ribs 1c of the brake disc 1 and the plate portion 2a of wheel 2 when seen from the inner periphery side of the brake disc 1, namely, a total section area of the slits 1d, each of which is open in a circumferential length-wise cross sectional view of the rib 1c, in a view seen from A-A, as shown in FIGS. 1C and 2C, is not more than 7000 mm$^2$.

Figure 6:
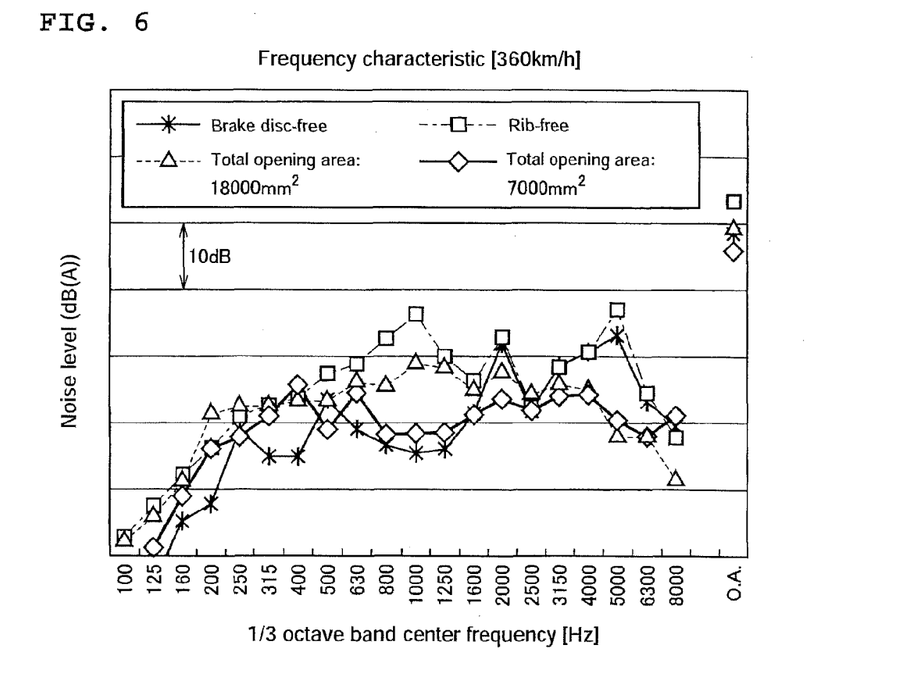
FIG. 6 is a diagram showing the relation of a center frequency to noise level during traveling at a speed of 360 km per hour.

The reason is that, in the relation between a center frequency having been subjected to a ⅓ octave band processing and a noise level during traveling at 360 km per hour, as shown in FIG. 6, an aerodynamic noise in the frequency band of 800 to 1250 Hz in terms of the center frequency can be greatly reduced in case the total opening area by slits 1d is 7000 mm$^2$.

In order to confirm the noise reducing effect, the amount of passing air flowing along the back side of the brake disc 1 upon rotation of the wheel 2 at 2220 rpm determined from the diameter (860 mm) of the wheel 2 was evaluated by fluid analysis for each Example shown in Table 1 below, envisaging traveling at 360 km per hour. Further, a finite element analysis was performed on the condition equivalent to applying the emergency brakes three times during traveling at a speed of 360 km/h, and the amount of deformation of the brake disc 1 was evaluated.

The brake disc in concern is a forged steel disc for the Shinkansen, having an inside diameter of 444 mm, an outside diameter of 720 mm, and a length of 47.5 mm as being from the frictional surface to the wheel contacting portion. The brake disc has twelve bolt fixing holes each center of which is on the circumference of a 580 mm diameter circle, and it is fixed with twelve bolts at circumferential positions spaced at equal intervals.

For comparison purpose, the fluid analysis and the finite element analysis were conducted also with respect to a rib-free brake disc (Comparative Example 1) and a brake disc (Comparative Example 2) of the shape shown in FIG. 10 being formed without slits at circumferentially intermediate positions of the ribs. Effects of Examples 1 to 7 according to the present invention, having ribs with the shape shown in FIG. 1 or FIG. 2, were confirmed.

TABLE 1

Figure 9:
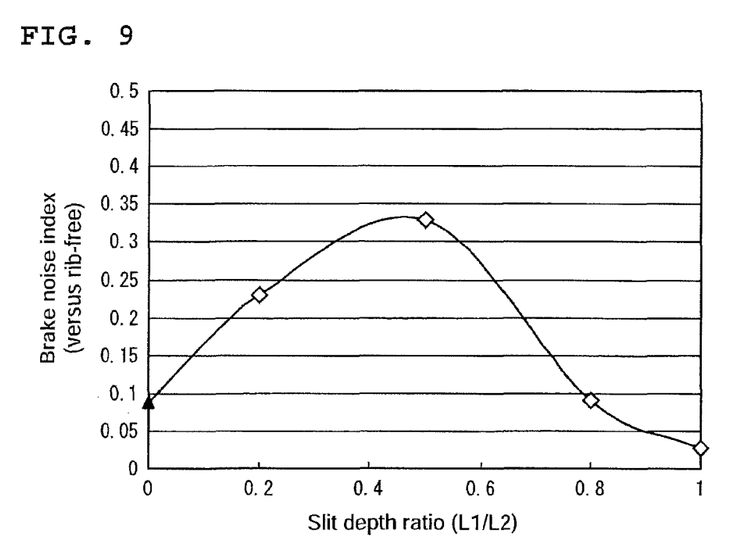
FIG. 9 is a diagram showing an evaluation result of brake noise of the brake disc.

| | Total opening area (mm$^2$) | L1/L2 | Air flowing amount ratio | Warpage ratio | Note |
|---|---|---|---|---|---|
| Example 1 | 3000 | 0.2 | 0.15 | 1.14 | FIG. 2 |
| Example 2 | 3000 | 0.25 | 0.16 | 1.14 | FIG. 2 |
| Example 3 | 3000 | 0.4 | 0.15 | 1.14 | FIG. 2 |
| Example 4 | 3000 | 0.5 | 0.16 | 1.14 | FIG. 2 |
| Example 5 | 3000 | 1 | 0.14 | 1.06 | FIG. 1 |
| Example 6 | 4600 | 1 | 0.24 | 1.05 | FIG. 1 |
| Example 7 | 7000 | 1 | 0.36 | 1.05 | FIG. 1 |
| Comparative example 1 | 20000 | — | 1.00 | 1.00 | Rib free |
| Comparative example 2 | 3000 | — | 0.17 | 1.16 | FIG. 9 |

Figure 7:
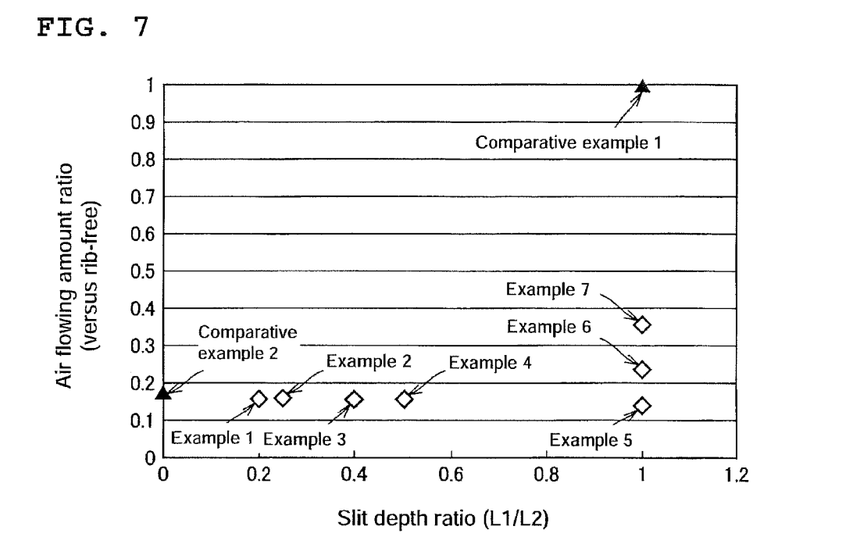
FIG. 7 is a diagram showing a relation between a depth ratio (L1/L2) of a slit provided in each rib and the amount of passing air, which is obtained by a fluid analysis method.

FIG. 7 is a diagram showing the relation between a depth ratio of a slit formed in each rib ((depth L1 of slit 1d in a direction from the wheel-side face of rib 1c toward the back side of the plate portion 1a)/(height L2 of rib 1c from the wheel-side face thereof toward the back side of the plate portion 1a)) and the amount of passing air, which is obtained by a fluid analysis method.

From FIG. 7 it is evident that in Examples 1 to 5, each having the same total slit opening area, the amount of passing air is almost constant irrespective of depth ratios (L1/L2) for slits provided in ribs. Since the amount of passing air clearly weighs in the amount of decrease of the aerodynamic noise as shown in FIG. 3, it is apparent from the relation shown in FIG. 7 that the aerodynamic noise level should be also approximately the same.

Figure 8:
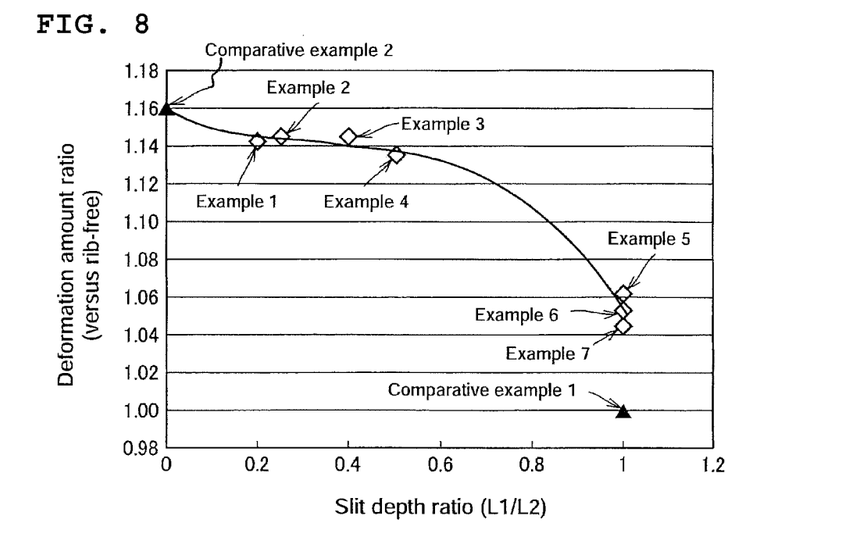
FIG. 8 is a diagram showing evaluation results of brake disc deformation amounts obtained with use of the analysis by a finite element method.

FIG. 8 is a diagram showing evaluation results of brake disc deformation amount obtained with use of the analysis by finite element method. From FIG. 8 it is recognized that Examples 1 to 5 each being the case having slits developed in the direction from the wheel-side face of rib toward the back side of the plate portion at intermediate portions of ribs, are smaller in brake disc deformation as compared with Comparative Example 2 even if while having ribs, the total opening area therein should be the same.

Moreover, when the total opening area is the same, the amount of deformation of the brake disc is particularly small in Example 5 wherein the depth ratio (L1/L2) of slits formed in ribs is 1, as compared with Examples 1 to 4 wherein the depth ratio (L1/L2) is not more than 0.5. From this fact, it is noted that in the case of the present invention it is preferable to set the slit depth L1 to be not less than half of the overall rib height L2. It is also recognized that it is preferable to set the slit depth L1 to be 0.8 times or more as large as the overall rib height L2.

Further, from the results obtained in Examples 6 and 7 it is noted that even if the total slit opening area is different, the brake disc deformation can be made small by forming, in an intermediate portion of each rib, a slit which develops from the wheel-side face of rib toward the back side of the plate portion.

As shown in FIG. 3, the aerodynamic noise hardly changes at a total opening area of not more than 3000 mm$^2$. Therefore, in the analyses of FIGS. 7 and 8, the minimum of the section areas of slits was set mainly at 3000 mm$^2$ so that the rib shape was changed for evaluation.

As shown in Examples 6 and 7, like Examples 1 to 5, the amount of brake disc deformation is kept lower than in Comparative Example 2 even with an increase of the total opening area. That is, it is noted that it is possible to keep the similar amount of deformation even if the total opening area is changed depending on a target amount of decrease of the aerodynamic noise.

In a high-speed railway vehicle, not only the aerodynamic noise generated during travel of the vehicle, but also a brake noise caused by friction between the brake disc and the brake lining upon application of the brake becomes an issue. The brake noise is attributable to the fact that an unstable vibration called self-excited vibration is developed in the brake disc with friction during braking.

Therefore, in addition to the above analysis, analytical models corresponding to brake discs of various slit depth ratios (L1/L2) were prepared and then each was subjected to a vibration mode analysis with use of a finite element method, followed by evaluation also with respect to the brake noise. The evaluation was made in the following manner. A damping ratio of self-excited vibration generated in each analytical model was represented in terms of a ratio to a damping ratio of self-excited vibration generated in a rib-free analytical model and then evaluation was made with the ratio (noise index) as an index. The smaller the noise index, the more suppressed the brake noise.

FIG. 9 is a diagram showing an evaluation result of brake noise of the brake disc. From the result shown in the same figure it is noted that the brake noise is suppressed by the provision of ribs with or without slits. It is also recognized that the brake noise is more suppressed when the rib slit depth ratio (L1/L2) is in the range of 0.8 to 1 than in case of the slit-free rib (L1/L2=0).

From above, it is preferable that the slit depth L1 be set to 0.8 times or more as large as the overall rib height L2 for suppressing a brake disc deformation caused by frictional heat as well as the brake noise.

It goes without saying that the present invention is not limited to the above examples, and that the embodiment may be appropriately modified insofar as the modification falls under the scope of the technical idea described in the appended claims.

For example, in cases shown in FIGS. 1 and 2 the ribs 1c are provided at the nearly radially middle position in the brake disc 1. However, as disclosed in Patent Literature 3, the rib's radial position for installing does not exert any influence on the decrease of aerodynamic noise and the influence thereof on the amount of brake disc deformation is also small. Therefore, also in the present invention, the rib's radial position for installing may be set at an inner or outer periphery position rather than the radially middle position unlike the position shown in FIG. 1 or 2.

Although, in the cases shown in FIGS. 1 and 2, all the tips of ribs 1c devoid of slits 1d are in contact with wheel 2, all the tips devoid of slits 1d are not necessarily contacted with the wheel. When the tips of ribs 1c are not in contact with wheel 2 and gaps are present between the rib tips and wheel 2, the total opening area shall be defined so as to include the gaps.

Further, in the cases shown in FIGS. 1 and 2, although unparallel opposed sides of the trapezoidal slit 1d formed at a circumferentially intermediate position of each rib 1c are parallel to respective sides of rib 1c, they need not to be necessarily parallel. The shape of each slit 1d is not limited to the trapezoidal shape, but may be, for example, in the form of a rectangular.

INDUSTRIAL APPLICABILITY

The present invention is applicable not only to a brake disc for a railway vehicle but also to a brake disc for automobiles and motorcycles.

REFERENCE SIGNS LIST

1: brake disc, 1a: plate portion, 1b: fin, 1c: rib, 1d: slit, 2: wheel, 2a: plate portion, 2b: rim portion, 2c: boss portion, 3a: fixing bolt, 3b: fixing nut

What is claimed is:

1. A brake disc for a railway vehicle in which a ring-shaped plate portion defining a circumferential direction and with a front side serving as a frictional surface is provided and a plurality of fins are projected and disposed radially on a back side of said plate portion, each fin having a first radially inward end face and a second radially outward end face, each the first radially inward end face and the second radially outward end face extending in the circumferential direction, said plate portion being fixed to a wheel, wherein a plurality of ribs is provided, each rib being provided between every pair of adjacent fins, each rib having a length extending in the circumferential direction with first and second opposing side faces extending in the circumferential direction, each rib having a constant width along a circumferential length thereof, the first opposing side face spaced radially outward from the first radially inward end face and the second opposing side face spaced radially inward from the second radially outward end face, and a plurality of slits is provided, each slit being disposed in a circumferentially intermediate portion of each of the plurality of ribs, and each slit developing in the direction from a wheel-side face of each of the plurality of ribs toward the back-side of said plate portion.

2. The brake disc for a railway vehicle according to claim 1, wherein each slit has a slit depth L1 and each rib has a rib height L2, and further wherein a ratio (L1/L2) of the slit depth L1 to the rib height L2 is in a range of 0.5 to 1, the slit depth being from the wheel-side face of each said rib toward the back side of said plate portion, the rib height being from the wheel-side face of each said rib up to the back side of said plate portion.

3. The brake disc for a railway vehicle according to claim 1, wherein each slit has an opening area formed by the slit in a circumferential length-wise cross section of each said rib, and further wherein a total area of the opening areas of all of said slits is not more than 7000 mm$^2$ in a state that the brake disc is fixed to the wheel.

* * * * *